United States Patent
Chen et al.

(10) Patent No.: US 8,432,078 B2
(45) Date of Patent: Apr. 30, 2013

(54) STATOR WITH ASYMMETRIC POLES AND SENSOR ORIENTED TO MORE ACCURATELY DETERMINE POSITION OF ROTOR

(75) Inventors: Yu Chen, Malmesbury (GB); Tuncay Celik, Malmesbury (GB); Andrew Charlton Clothier, Malmesbury (GB); Stephen Greetham, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 379 days.

(21) Appl. No.: 12/709,104

(22) Filed: Feb. 19, 2010

(65) Prior Publication Data

US 2010/0225207 A1    Sep. 9, 2010

(30) Foreign Application Priority Data

Mar. 3, 2009  (GB) .................... 0903664.1

(51) Int. Cl.
*H02K 11/00*    (2006.01)
(52) U.S. Cl.
USPC ...................... 310/68 B; 310/68 R
(58) Field of Classification Search .......... 310/68 B, 310/68 R, 216.096–216.104, 216.111, 49.22–49.34
See application file for complete search history.

(56) References Cited

U.S. PATENT DOCUMENTS

| | | | | |
|---|---|---|---|---|
| 3,991,332 A * | 11/1976 | Kawamura et al. | ........ | 310/49.32 |
| 4,017,851 A * | 4/1977 | Felice | ............. | 340/815.87 |
| 4,205,244 A * | 5/1980 | Fukushima | ............. | 310/49.22 |
| 4,311,934 A * | 1/1982 | Flaig | ............. | 310/216.035 |
| 4,429,263 A * | 1/1984 | Muller | ............. | 318/400.41 |
| 4,547,714 A * | 10/1985 | Muller | ............. | 318/400.41 |
| 4,565,955 A * | 1/1986 | Kubota | ............. | 318/696 |
| 4,626,752 A * | 12/1986 | Fujisaki et al. | ............. | 318/400.38 |
| 5,610,518 A | 3/1997 | Chamberlain, IV | | |
| 5,675,226 A * | 10/1997 | Riola' | ............. | 318/400.41 |
| 6,861,819 B2 | 3/2005 | Marioni | | |
| 7,479,755 B2 * | 1/2009 | Acquaviva et al. | ............. | 318/720 |
| 2003/0057781 A1 * | 3/2003 | Shukuri et al. | ............. | 310/68 B |

FOREIGN PATENT DOCUMENTS

| | | |
|---|---|---|
| DE | 2 346 380 | 11/1974 |
| DE | 195 33 344 | 3/1997 |
| EP | 0 682 404 | 11/1995 |
| EP | 0949744 | 10/1999 |
| EP | 1 351 375 | 10/2003 |
| EP | 1351375 A1 * | 10/2003 |
| EP | 1 919 074 | 5/2008 |
| GB | 2070354 A * | 9/1981 |

(Continued)

OTHER PUBLICATIONS

GB Search Report dated Jun. 30, 2009, directed at counterpart GB Application No. GB0903664.1; 1 page.

(Continued)

*Primary Examiner* — Tran Nguyen
*Assistant Examiner* — Naishadh Desai
(74) *Attorney, Agent, or Firm* — Morrison & Foerster LLP

(57) ABSTRACT

An electric machine that includes a stator and a Hall-effect sensor. The stator includes a pair of asymmetric poles and the sensor is oriented such that the plane of the sensor is substantially parallel to armature field lines passing through the sensor.

16 Claims, 1 Drawing Sheet

FOREIGN PATENT DOCUMENTS

| | | |
|---|---|---|
| GB | 2345586 | 7/2000 |
| JP | 8-285953 | 11/1996 |
| KR | 10-0983718 | 9/2010 |
| WO | WO-2005/117247 | 12/2005 |
| WO | WO-2007-107513 | 9/2007 |

OTHER PUBLICATIONS

International Search Report and Written Opinion mailed Aug. 17, 2011, directed towards International Patent Application PCT/GB2010/050301; 9 pages.

* cited by examiner

STATOR WITH ASYMMETRIC POLES AND SENSOR ORIENTED TO MORE ACCURATELY DETERMINE POSITION OF ROTOR

REFERENCE TO RELATED APPLICATIONS

This application claims the priority of United Kingdom Application No. 0903664.1, filed Mar. 3, 2009, the entire contents of which are incorporated herein by reference.

FIELD OF THE INVENTION

The present invention relates to an electric machine and in particular to the positioning of a Hall-effect sensor within the electric machine.

BACKGROUND OF THE INVENTION

The output power of an electric motor is critically dependant on accurate synchronisation of phase energisation and rotor position. Accordingly, the motor requires some means for accurately determining the position of the rotor. A relatively cheap solution is a Hall-effect sensor, which may be located at a slot opening between poles of the stator. However, owing to the effect of armature reaction, the sensor is sensitive to both the rotor field and the armature field. For a stator having asymmetric poles, the effect of armature reaction makes it particularly difficult to determine the position of the rotor with any confidence.

SUMMARY OF THE INVENTION

In a first aspect, the present invention provides an electric motor comprising a stator and a Hall-effect sensor, wherein the stator comprises a pair of asymmetric poles and the sensor is oriented such that the plane of the sensor is substantially parallel to armature field lines passing through the sensor.

By orienting the sensor such that it is substantially parallel to the armature field lines passing through the sensor, the sensor is much less sensitive to the effect of armature reaction. In particular, the magnetic field sensed by the Hall-effect sensor is primarily that from a rotor of the electric machine. Accordingly, accurate synchronisation of phase energisation and rotor position may be achieved resulting in a more powerful and efficient electric machine. Moreover, since the sensor is less sensitive to the effect of armature reaction, the sensor is less sensitive to any current changes in a winding of the stator. Accordingly, the electric machine is able to perform efficiently, irrespective of the current in the winding.

The electric machine ideally comprises a permanent-magnet rotor having an interpole axis. As a consequence of orienting the sensor such that it is parallel to armature field lines, the interpole axis may intersect the plane of the sensor at a non-orthogonal angle. Consequently, the sensor is less sensitive to the magnetic field of the rotor. However, this drawback is more than compensated by the fact that the sensor is much less sensitive to the armature field. Accordingly, in spite of the reduced sensitivity to the rotor field, the sensor is nevertheless able to more accurately determine the position of the rotor.

In a second aspect, the present invention provides an electric machine comprising a permanent-magnet rotor, a stator and a Hall-effect sensor, wherein the stator comprises a pair of asymmetric poles and the sensor is oriented such that an interpole axis of the rotor intersects the plane of the sensor at a non-orthogonal angle.

Owing to the asymmetry in the poles of the stator, it may not always be possible to align the sensor such that the plane of the sensor is substantially parallel to the armature field lines passing through the sensor. In particular, changes in current in the stator winding may cause the direction of the armature field lines to vary, albeit slightly. Nevertheless, the sensor is oriented so as to be as close as possible to this condition. In so doing, the sensor is oriented such that the interpole axis of the rotor intersects the plane of the sensor at a non-orthogonal angle.

For each of the aforementioned aspects, the poles may be separated by a slot opening, with the sensor then being located at the slot opening. The senor may be located adjacent the slot opening or within the slot opening. In being located adjacent the slot opening, a relatively small slot opening may then be employed. This then has the advantage that the poles of the stator capture a good portion of the magnetic flux from the rotor. In being located within the slot opening, a larger slot opening is typically required. However, the armature field lines within the slot opening are generally straighter than those outside the slot opening. Accordingly, by locating the sensor within the slot opening, the sensor can be oriented such it is much less sensitive to the armature field and thus much less sensitive to the effect of armature reaction.

Advantageously, each pole comprises a leading edge and a trailing edge relative to the direction of orientation of the rotor. The leading edge of each pole is then ideally thicker than the trailing edge. This form of asymmetry in the poles has the benefit of reducing the inductance of the stator without lowering the saturation point.

The electric machine is ideally suited for use with a battery. Since the sensor is much less sensitive to the effect of armature reaction, the sensor is much less sensitive to any changes in the winding current. Consequently, as the battery discharges, the electric machine is able to maintain accurate synchronisation of the phase energisation and rotor position.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
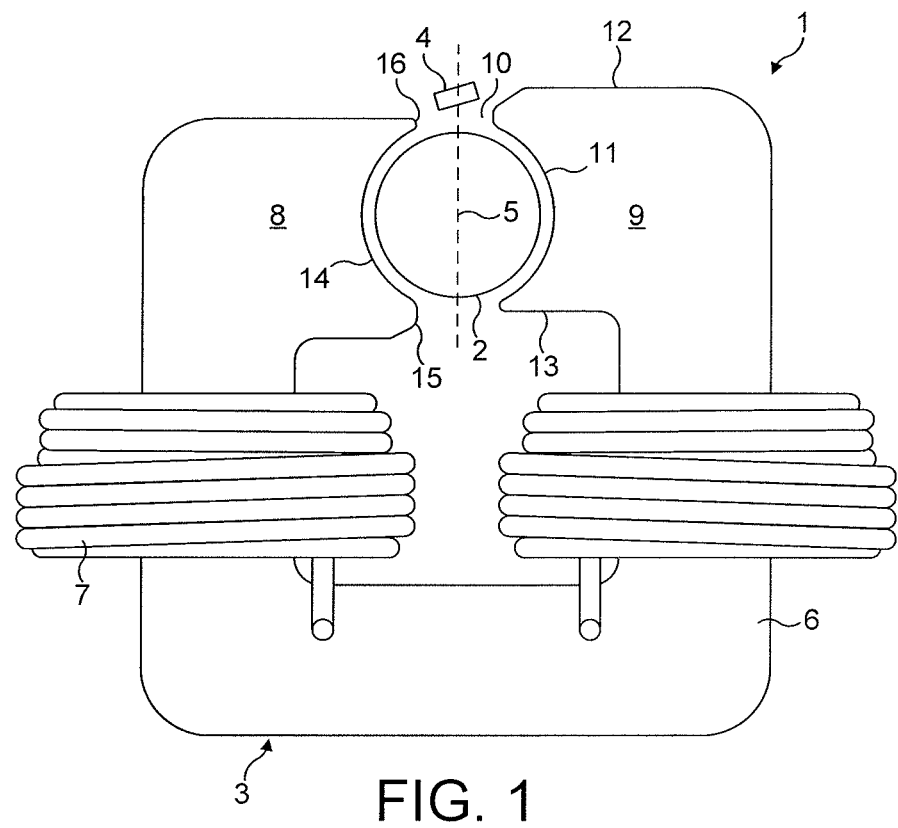
FIG. 1 illustrates an electric motor in accordance with the present invention.

The motor 1 of FIG. 1 comprises a rotor 2, a stator 3 and a Hall-effect sensor 4.

The rotor 2 comprises a two-pole permanent magnet having an interpole axis 5.

The stator 3 comprises a stator core 6 about which a single-phase winding 7 is wound. The stator core 6 is c-shaped and comprises a pair of asymmetric poles 8,9 separated by a slot opening 10. Each pole 8,9 has a pole face 11, a first side 12 and an opposite second side 13 that extend from the pole face 11. Each pole face 11 includes an arcuate recess or pole arc 14, a leading edge 15 and a trailing edge 16 relative to the direction of rotation of the rotor 2. The leading edge 15 extends between the pole arc 14 and the first side 12 of each pole 8,9, and the trailing edge 16 extends between the pole arc 14 and the second side 13 of each pole 8,9. The pole arc 14 thus extends between the leading and trailing edges 15,16.

The leading edge 15 of each pole 8,9 is thicker than that of the trailing edge 16 in a direction normal to the rotational axis of the rotor 2. Additionally, the leading edge 15 of each pole 8,9 is chamfered. By providing thicker leading edges 15, the saturation point of the stator 3 is increased. Additionally, by providing thinner trailing edges 16 and chamfering the corners of the leading edges 15, the inductance of the stator 3 is reduced. The asymmetry in the poles 8,9 therefore provides a stator 3 of lower inductance without lowering the saturation point.

Figure 2:
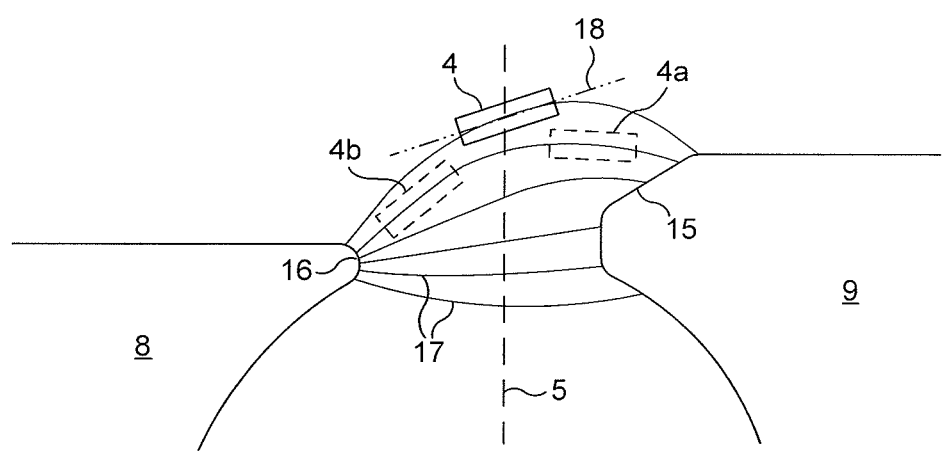
FIG. 2 illustrates the armature field lines at the poles of the motor of FIG. 1.

Referring now to FIG. 2, current in the winding 7 generates an armature field around the stator core 6. Owing to the asymmetry in the poles 8,9, the armature field lines 17 between the poles 8,9 are asymmetric, particularly in the region of the slot opening 10. In particular, the armature field lines 17 are neither symmetrically arranged about a common axis nor are the field lines 17 parallel to one another.

The Hall-effect sensor 4 includes a planar element that generates a potential difference or Hall voltage in response to a magnetic field perpendicular to the plane 18 of the element. The Hall-effect sensor 4 is located adjacent the slot opening 10 in the stator core 6. The sensor 4 is oriented such that plane 18 of the sensor 4 is parallel to the armature field lines 17 passing through the sensor 4. It is not necessary that the sensor 4 is located at the centre of the slot opening 10. Instead, the position of the sensor 4 may be offset such that the sensor 4 is closer to one of the poles 8,9, as is represented by the dotted positions 4a and 4b in FIG. 2. Indeed, in positioning the sensor 4 off centre, the sensor 4 may be located at a point where the curvature of the armature field lines 17 through the sensor 4 is reduced. Regardless of the position of the sensor 4, the sensor 4 continues to be oriented such that the sensor plane 18 is parallel to the armature field lines 17 passing through the sensor 4.

As a consequence of the orientation of the sensor 4, the interpole axis 5 of the rotor 2 intersects the plane 18 of the sensor 4 at a non-orthogonal angle, i.e. at an angle other than 90 degrees. In other words, as the rotor 2 rotates and the interpole axis 5 intersects the plane 18 of the sensor 4, the angle formed between the interpole axis 5 and the plane 18 of the sensor 4 is non-orthogonal.

By orienting the sensor 4 such that the plane 18 of the sensor 4 is parallel to the armature field lines 17 passing through it, the sensor 4 is less sensitive to the armature field. Ideally, the sensor 4 is oriented such that the sensor 4 is completely insensitive to the armature field. However, in reality this is very difficult to achieve. In particular, the armature field lines 17 adjacent the slot opening 10 are curved, while the sensor 4 is planar. Nevertheless, by orienting the sensor 4 such that the sensor plane 18 is parallel to the armature field lines 17 passing through it, the Hall voltage arising from the armature field 17 is much reduced. Consequently, the sensor 4 is much less sensitive to the effect of armature reaction.

Since the sensor 4 is not orthogonally aligned with the interpole axis 5 of the rotor 2, the sensor 4 is less sensitive to the magnetic field of the rotor 2. However, this drawback is more than compensated by the fact that the sensor 4 is less sensitive to the armature field and thus less sensitive to the effect of armature reaction.

Since the sensor 4 is much less sensitive to the effect of armature reaction, more accurate synchronisation of phase energisation and rotor position is achievable resulting in a more powerful and efficient motor 1.

The positioning of the Hall-effect sensor 4 has particular benefits when the current in the winding 7 is not constant. As the current in the winding 7 varies, the strength of the armature field 17 also varies. If the sensor 4 was sensitive to armature reaction, the signal output by the sensor 4 would vary in electrical angle with the current in the winding 7. Synchronisation of phase energisation and rotor position would then be very difficult. With the motor 1 of the present invention, however, the sensor 4 is much less sensitive to the effect of armature reaction and thus the position of the rotor 2 may be more accurately determined irrespective of the current in the winding 7. The present invention thus provides a more powerful and efficient motor 1 in which control of phase energisation is both simpler and cheaper.

Since the Hall-effect sensor 4 is less sensitive to the effect of armature reaction, the motor 1 is ideally suited for use with a battery. As the battery discharges, the current that is driven into the winding 7 drops. However, since the sensor 4 is less sensitive to the effect of armature reaction, the motor 1 is able to maintain relatively accurate synchronisation of phase energisation and rotor position as the battery discharges. Consequently, the motor 1 is able to maintain good efficiency.

In the embodiment described above, the stator poles 8,9 have a particular form of asymmetry. However, the stator 3 might equally have poles 8,9 of different asymmetry.

By ensuring that the Hall-effect sensor 4 is oriented parallel to the armature field lines 17 passing through the sensor 4, the sensor 4 continues to be less sensitive to the armature field, irrespective of the asymmetry in the poles 8,9.

In the embodiment described above and illustrated in FIG. 1, the Hall-effect sensor 4 is located adjacent the slot opening 10. The primary reason for this is that the width of the slot opening 10 is smaller than that of the sensor 4. In having a small slot opening 10, the poles 8,9 of the stator 3 surround a good portion of a rotor 2, thereby providing effective capture of rotor flux. Nevertheless, a wider slot opening 10 may be employed such that the Hall-effect sensor 4 can be located within the slot opening 10. The armature field lines 17 within the slot opening 10 are typically straighter than those adjacent the slot opening 10. Accordingly, by locating the sensor 4 within the slot opening 10, the sensor 4 can be oriented such it is much less sensitive to the armature field 17 and thus much less sensitive to the effect of armature reaction.

For a motor having asymmetric stator poles, the effect of armature reaction would normally make it difficult to position a Hall-effect sensor in such a manner that the rotor position can be accurately determined. The present invention is predicated on the identification that the magnetic field at the slot opening can be resolved into two components: the armature field and the rotor field. By orienting a Hall-effect sensor such that its plane is parallel to armature field lines passing through the sensor, the armature field sensed by the sensor is significantly reduced. Consequently, the magnetic field sensed by the Hall-effect sensor at the slot opening is primarily that of the rotor field.

There is an existing prejudice that a Hall-effect sensor should always be positioned normal to the interpole axis of a rotor; this then maximises the sensitivity of the sensor to the magnetic field of the rotor. The present invention overcomes this prejudice by arranging for the sensor to be tilted relative to the interpole axis of the rotor. While the sensor is then less sensitive to the magnetic field of the rotor, this drawback is more than compensated by the fact that the sensor is much less sensitive to the effect of armature reaction. Accordingly, in spite of the reduced sensitivity to the rotor field, the sensor is nevertheless able to more accurately determine the position of the rotor.

The present invention thus demonstrates that a Hall-effect sensor may be arranged at a slot opening in a stator having asymmetric poles in such a way that accurate determination of rotor position is nevertheless possible.

While the present invention has thus far been described with reference to a motor, it will be appreciated that the principles of the invention are equally applicable to a generator or other electric machine.

The invention claimed is:

1. An electric machine comprising a permanent-magnet rotor, a stator and a Hall-effect sensor, wherein the stator comprises a pair of asymmetric poles, the sensor generates a voltage in response to a magnetic field passing through the sensor in a direction perpendicular to a plane of the sensor, and the sensor is oriented such that the plane is substantially parallel to armature field lines passing through the sensor, and an interpole axis of the rotor that passes through the sensor intersects the plane of the sensor at a non-orthogonal angle.

2. An electric machine as claimed in claim 1, wherein the poles are separated by a slot opening and the sensor is located at the slot opening.

3. An electric machine as claimed in claim 2, wherein the sensor is located adjacent the slot opening.

4. An electric machine as claimed in claim 2, wherein the sensor is located in the slot opening.

5. An electric machine as claimed in claim 1, wherein each pole comprises a leading edge and a trailing edge, and the leading edge is thicker than the trailing edge.

6. An electric machine as claimed in claim 5, wherein each pole comprises a pole arc extending between the leading edge and the trailing edge.

7. An electric machine as claimed in claim 1, wherein the electric machine is a single-phase, two-pole permanent-magnet motor.

8. An electric machine as claimed in claim 1, wherein the electric machine is a battery-powered motor.

9. An electric machine comprising a permanent-magnet rotor, a stator and a Hall-effect sensor, wherein the stator comprises a pair of asymmetric poles, the sensor generates a voltage in response to a magnetic field passing through the sensor in a direction perpendicular to a plane of the sensor, and the sensor is oriented such that an interpole axis of the rotor passing through the sensor intersects the plane at a non-orthogonal angle.

10. An electric machine as claimed in claim 9, wherein the poles are separated by a slot opening and the sensor is located at the slot opening.

11. An electric machine as claimed in claim 10, wherein the sensor is located adjacent the slot opening.

12. An electric machine as claimed in claim 10, wherein the sensor is located in the slot opening.

13. An electric machine as claimed in claim 9, wherein each pole comprises a leading edge and a trailing edge, and the leading edge is thicker than the trailing edge.

14. An electric machine as claimed in claim 13, wherein each pole comprises a pole arc extending between the leading edge and the trailing edge.

15. An electric machine as claimed in claim 9, wherein the electric machine is a single-phase, two-pole permanent-magnet motor.

16. An electric machine as claimed in claim 9, wherein the electric machine is a battery-powered motor.

* * * * *